United States Patent Office 3,372,140
Patented Mar. 5, 1968

3,372,140
STABILIZED OLEFIN POLYMERS
Donald R. Witt, Bartlesville, Okla., assignor to Phillips Petroleum Company, a corporation of Delaware
No Drawing. Filed Sept. 13, 1965, Ser. No. 487,060
11 Claims. (Cl. 260—45.9)

ABSTRACT OF THE DISCLOSURE

Polymers are stabilized with a compound having the general formula $M(BR_4)_y$ wherein M is ammonium, lithium, sodium, potassium, rubidium, cesium, beryllium, magnesium, calcium, strontium, or barium; y is the valence of M; and R is a 1 to 20 carbon atom radical selected from the group consisting of alkyl, cycloalkyl, aryl, and combinations thereof. An exemplary stabilizer is ammonium tetramethylborohydride.

---

This invention relates to stabilized normally solid olefin polymers.

In recent years, normally solid plastic materials which have broad utility have been prepared by the polymerization of olefins. The normally solid olefin polymers are fabricated into usable form, most generally, by heating the polymers to a temperature above the melting point and then shaping the molten mass into the desired form by various techniques such as extrusion, injection, and blow molding. However, in environments of elevated temperatures employed during processing and fabrication, such polymers exhibit a decrease in melt index which decreases the processability of the polymers. Changes in the melt index of the polymers create problems for the fabricator in reusing the polymer formed into runners, cutout portions and trimmings because the flow properties are changed. Reprocessing of such polymer requires changes in the fabrication conditions and operating cycle. Also, the producer of the polymer is faced with the problem of a decrease in the melt index of the polymer as produced during the processing of the polymer into a form usable by the fabricator, such as during pelletizing.

Accordingly, an object of this invention is to provide improved stabilization of normally solid olefin polymers.

Another object of this invention is to provide an improved method for stabilizing olefin polymers against melt index decrease.

Still another object of this invention is to provide a new composition of olefin polymers capable of being fabricated without being adversely degraded.

Still another object of this invention is to provide compounds which improve the stability of olefin polymers.

Other objects, aspects and advantages of this invention will become apparent to those skilled in the art upon further study of this disclosure and the appended claims.

I have now discovered that olefin polymers, in general, can be effectively stabilized against degradation during processing and fabrication by incorporation therein of certain substituted borohydrides. The borohydrides applicable to this invention have the general formula: $M(BR_4)_x$ wherein M is a member selected from the group consisting of the ammonium radical, lithium, sodium, potassium, rubidium, cesium, beryllium, magnesium, calcium, strontium, and barium; x is the valence of M; and R is a 1 to 20 carbon atom radical selected from the group consisting of alkyl, cycloalkyl, aryl, and all combinations thereof. The four R's can be the same, partially the same, or all different. Examples of applicable borohydrides are ammonium tetramethylborohydride, ammonium tetraethylborohydride, ammonium methyl(tricapryl)borohydride, ammonium trimethyl(cetyl)borohydride, sodium tetraphenylborohydride, lithium dimethyl(dibenzyl)borohydride, potassium tetraeicosylborohydride, rubidium tetracyclohexylborohydride, cesium tetra-o-tolylborohydride, beryllium tetra-1-anthrylborohydride, magnesium dipropyl(di-1-methylcyclohexyl)borohydride, calcium tetramethylborohydride, strontium diethyl(di - 3 - cyclohexylphenyl)borohydride, barium tetra-3-phenylcyclopentylborohydride, ammonium tetraphenylborohydride, ammonium dimethyl(di-m-tolyl)borohydride, and the like.

The stabilizing compound of this invention can be incorporated into the polymer by any suitable means. One method of incorporating the stabilizing compound involves dissolving the stabilizing compound in a volatile solvent such as acetone, ethyl ether, methyl or ethyl alcohol, and the like, and spraying the particulate polymer with the resulting solution. Such spraying of the particulate polymer can be done, for example, during conveying of the polymer in a screw conveyor or while tumbling the polymer particles in a drum. The solvent is subsequently removed by a current of air and/or heating, and the treated polymer can be stored for subsequent use or processed immediately. Another method for incorporating a stabilizing compound in a polymer is by dry-blending or by milling or kneading processes which use, for example, a Banbury mixer or a roll mill.

The stabilizing compounds of this invention can be incorporated into the polymer in any desired amount. Generally, the amount of the stabilizer compound used will be in the range of about 0.01 to about 3.0 percent by weight based on the polymer. Preferably, 0.03 to 1.3 percent by weight based on the polymer will practically eliminate a decrease in melt index during processing or result in an increase in melt index which improves the processability of the polymer.

The stabilizing compounds of this invention can be effectively employed in olefin polymers which are subject to degradation of melt index. Such polymers include those made from olefins having 2 to 8 carbon atoms per molecule and copolymers formed from combinations of such olefins. Examples of polymers that can be used are polyethylene, polypropylene, poly(3-methyl-1-butene) poly (4 - methyl - 1-pentene), ethylene-propylene copolymer, ethylene-butene-1 copolymer, and the like. The olefin polymers capable of being stabilized in accordance with this invention can be prepared by any of the various known polymerization processes. For example, the polymers prepared by the polymerization process described and claimed in U.S. Patent 2,825,721 of Hogan et al. can be stabilized in accordance with this invention. The polymer to be stabilized can contain other additives including stress cracking inhibitors, oxidation inhibitors, vulcanization accelerators, fillers, pigments, and the like.

The following example will illustrate the present invention in better detail, but it is not to be construed as limiting the invention:

Example I

Polyethylene, prepared in accordance with the Hogan et al. Patent U.S. 2,825,721 (1958), having a density of 0.960 gram/cc. as determined by ASTM D1505–63T and a particle size of 4 to 10 U.S. Standard mesh was divided into 6 samples of 50 grams each. One sample was not treated and serves as a control while each of the other five samples was sprayed with the indicated amount of candidate stabilizer dissolved in 20 ml. of methyl alcohol. The solvent was removed by heating in an oven at 200° F. Each sample was milled on a two-roll mill 5 minutes and then heated at a temperature of 374° F. At the indicated time intervals subsamples of each sample were processed for melt index determination in accordance with ASTM D1238–62T, Condition E, method except that the amount extruded in 2 minutes was weighed and multiplied by 5 instead of weighing the amount extruded in 10 minutes. This was done to follow more closely the changes in melt index of the samples. The results of these six sample tests are shown in the following table:

| Stabilizer | Weight, grams | Mill Time (in.) | Melt Index Total Heating Time, Minutes | | | | | Percent Change |
|---|---|---|---|---|---|---|---|---|
| | | | 6.67 | 8.67 | 10.67 | 12.67 | 14.67 | |
| (1) None (Control) | | 5 | 0.272 | 0.234 | 0.208 | 0.180 | 0.160 | −41 |
| (2) Ammonium tetramethylborohydride | 0.0337 | 5 | 0.364 | 0.295 | 0.314 | 0.313 | 0.306 | −16 |
| (3) Ammonium tetraethylborohydride | 0.0500 | 5 | 0.286 | 0.294 | 0.294 | 0.302 | 0.300 | +5 |
| (4) Ammonium methyl (tricapryl) borohydride | 0.0554 | 5 | 0.312 | 0.324 | 0.332 | 0.336 | 0.337 | +8 |
| (5) Ammonium trimethyl-(cetyl) borohydride | 0.0957 | 5 | 0.382 | 0.378 | 0.376 | 0.376 | 0.374 | −2 |
| (6) Sodium tetraphenylborohydride | 0.1000 | 5 | 0.200 | 0.215 | 0.206 | 0.200 | 0.200 | 0 |

The values of melt index obtained after 6.67 minutes (400 seconds) heating time represent the instantaneous initial melt indexes as equilibrium temperature is reached. In a comparison of the final melt indexes (14.67 minutes heating time) with the initial melt indexes, it is apparent that the use of the stabilizers of this invention remarkably reduces the drop-off of melt index of the polymer during heating.

Reasonable variations and modifications of this invention will be apparent in view of the foregoing disclosure and appended claims which will not depart from the scope thereof.

I claim:
1. A solid polymer formed from at least one 1-olefin having 2 to 8 carbon atoms per molecule, said solid polymer having a melt index stabilizing amount of a compound having the general formula $M(BR_4)_x$ wherein M is a member selected from the group consisting of the ammonium radical, lithium, sodium, potassium, rubidium, cesium, beryllium, magnesium, calcium, strontium, and barium; $x$ is the valence of M; and R is a 1 to 20 carbon atom radical selected from the group consisting of alkyl, cycloalkyl, aryl, and combinations thereof.
2. The polymer of claim 1 wherein the stabilizing amount is 0.01 to 3.0 weight percent.
3. The polymer of claim 1 wherein the stabilizing amount is 0.03 to 1.3 weight percent.
4. The polymer of claim 1 wherein the compound is sodium tetraphenylborohydride.
5. The polymer of claim 1 wherein the compound is ammonium trimethyl(cetyl)borohydride.
6. The polymer of claim 1 wherein the compound is ammonium tetraethylborohydride.
7. The polymer of claim 1 wherein the compound is ammonium methyl(tricapryl)borohydride.
8. The polymer of claim 1 wherein the compound is ammonium tetramethylborohydride.
9. Polyethylene having a melt index stabilizing amount of a compound having the general formula $M(BR_4)_x$ wherein M is a member selected from the group consisting of the ammonium radical, lithium, sodium, potassium, rubidium, cesium, beryllium, magnesium, calcium, strontium, and barium; $x$ is the valence of M; and R is a 1 to 20 carbon atom radical selected from the group consisting of alkyl, cycloalkyl, aryl, and combinations thereof.
10. Polyethylene having 0.03 to 1.3 weight percent of sodium tetraphenylborohydride.
11. A solid polymer formed from at least 2 1-olefins having 2 to 8 carbon atoms per molecule, said solid polymer having a melt index stabilizing amount of a compound having the general formula $M(BR_4)_x$ wherein M is a member selected from the group consisting of the ammonium radical, lithium, sodium, potassium, rubidium, cesium, beryllium, magnesium, calcium, strontium, and barium; $x$ is the valence of M; and R is a 1 to 20 carbon atom radical selected from the group consisting of alkyl, cycloalkyl, aryl, and combinations thereof.

References Cited

UNITED STATES PATENTS 3,230,225  1/1966  Arrigo _____ 260—45.9 X
3,193,521  7/1965  Jasching _____ 260—45.9 X DONALD E. CZAJA, *Primary Examiner.*

M. J. WELSH, *Assistant Examiner.*